United States Patent [19]
Ratner

[11] Patent Number: 6,005,986
[45] Date of Patent: Dec. 21, 1999

[54] METHOD OF IDENTIFYING THE SCRIPT OF A DOCUMENT IRRESPECTIVE OF ORIENTATION

[75] Inventor: Alan S Ratner, Clarksville, Md.

[73] Assignee: The United States of America as represented by the National Security Agency, Washington, D.C.

[21] Appl. No.: 08/984,126

[22] Filed: Dec. 3, 1997

[51] Int. Cl.[6] .................................................. G06K 9/62
[52] U.S. Cl. ..................... 382/288; 382/228; 382/186; 382/178
[58] Field of Search ................................. 382/224, 225, 382/228, 229, 288, 178, 185, 186; 704/1–10

[56] References Cited

U.S. PATENT DOCUMENTS

| | | | |
|---|---|---|---|
| 3,846,755 | 11/1974 | Hart | 340/146.3 |
| 4,398,256 | 8/1983 | Nussmeier et al. | 382/41 |
| 4,435,837 | 3/1984 | Abernathy | 382/41 |
| 5,375,176 | 12/1994 | Spitz | 382/39 |
| 5,377,280 | 12/1994 | Nakayama | 382/17 |
| 5,425,110 | 6/1995 | Spitz | 382/192 |
| 5,444,797 | 8/1995 | Spitz et al. | 382/192 |
| 5,454,046 | 9/1995 | Carmen, II | 382/186 |
| 5,664,027 | 9/1997 | Ittner | 382/170 |
| 5,892,854 | 4/1999 | De Quieroz et al. | 382/288 |

OTHER PUBLICATIONS

Liu et al., Extracting Individual Features From Moments for Chinese Writer Identification, IEEE, 1995 pp. 438–441.
Al–Yousefi et al., Recognition of Arabic Characters, IEEE, 1992, pp. 853–857.
Lo et al., Pattern Recognition Using 3–D Moments, IEEE, 1990, pp. 540–544.

*Primary Examiner*—Amelia Au
*Assistant Examiner*—Martin E Miller
*Attorney, Agent, or Firm*—Robert D. Morelli

[57] ABSTRACT

The present invention is a method of identifying the script and orientation of a document image by identifying each set of connected pixels in the document image; computing the number of pixels in each set of connected pixels; computing the horizontal mean position of the pixels; computing the vertical mean position of the pixels; computing the horizontal extent of the pixels; computing the vertical extent of the pixels; computing a plurality of moment values for each set of connected pixels in the document image using a unique normalized centered moment calculation; grouping the moment values according to moment type; sorting the moment values within each moment group according to moment value; selecting moment values from each rank ordered moment group in order to characterize the document image; comparing the selected moment values to moment values for representative document images in a number of scripts and orientations; defining the script and orientation of the document image as being the same as the representative document that it compares most favorably to; selecting at least one script of interest to the user; rotating the document image to a user-defined orientation if the document image is of a script of interest to the user; and presenting the rotated document to the user if the document image is of a script of interest to the user.

10 Claims, 4 Drawing Sheets

1. RECEIVING A DOCUMENT IMAGE
2. IDENTIFYING EACH SET OF CONNECTED PIXELS
3. COMPUTING THE TOTAL NUMBER OF PIXELS IN EACH PIXEL SET
4. COMPUTING THE HORIZONTAL MEAN OF EACH PIXEL SET
5. COMPUTING THE VERTICAL MEAN OF EACH PIXEL SET
6. COMPUTING THE HORIZONTAL EXTENT OF EACH PIXEL SET
7. COMPUTING THE VERTICAL EXTENT OF EACH PIXEL SET
8. COMPUTING MOMENT VALUES FOR EACH PIXEL SET
9. GROUPING THE MOMENTS ACCORDING TO TYPE
10. SORTING THE MOMENTS IN EACH GROUP ACCORDING TO VALUE
11. SELECTING CERTAIN MOMENTS TO CHARACTERIZE THE IMAGE
12. COMPARING THE CHARACTERIZED IMAGE TO REPRESENTATIVE DOCUMENT IMAGES
13. DEFINING THE SCRIPT AND ORIENTATION OF THE IMAGE AS THAT OF THE REPRESENTATIVE DOCUMENT IT COMPARES TO MOST FAVORABLY
14. SELECTING AT LEAST ONE SCRIPT OF INTEREST
15. ROTATING THE IMAGE TO A USER-DEFINED ORIENTATION IF THE IMAGE IS IN ONE OF THE SELECTED SCRIPTS
16. PRESENTING THE ROTATED IMAGE TO THE USER IF THE IMAGE IS IN ONE OF THE SELECTED SCRIPTS

1. RECEIVING A DOCUMENT IMAGE

2. IDENTIFYING EACH SET OF CONNECTED PIXELS

3. COMPUTING THE TOTAL NUMBER OF PIXELS IN EACH PIXEL SET

4. COMPUTING THE HORIZONTAL MEAN OF EACH PIXEL SET

5. COMPUTING THE VERTICAL MEAN OF EACH PIXEL SET

6. COMPUTING THE HORIZONTAL EXTENT OF EACH PIXEL SET

7. COMPUTING THE VERTICAL EXTENT OF EACH PIXEL SET

8. COMPUTING MOMENT VALUES FOR EACH PIXEL SET

9. GROUPING THE MOMENTS ACCORDING TO TYPE

10. SORTING THE MOMENTS IN EACH GROUP ACCORDING TO VALUE

11. SELECTING CERTAIN MOMENTS TO CHARACTERIZE THE IMAGE

12. COMPARING THE CHARACTERIZED IMAGE TO REPRESENTATIVE DOCUMENT IMAGES

13. DEFINING THE SCRIPT AND ORIENTATION OF THE IMAGE AS THAT OF THE REPRESENTATIVE DOCUMENT IT COMPARES TO MOST FAVORABLY

14. SELECTING AT LEAST ONE SCRIPT OF INTEREST

15. ROTATING THE IMAGE TO A USER-DEFINED ORIENTATION IF THE IMAGE IS INONE OF THE SELECTED SCRIPTS

16. PRESENTING THE ROTATED IMAGE TO THE USER IF THE IMAGE IS IN ONE OF THE SELECTED SCRIPTS

$\overline{X} = (1/9)(1 + 2 + 3 + 4 + 5 + 6 + 7 + 8 + 9) = 5$ $\overline{Y} = (1/9)(5 + 4 + 3 + 2 + 1 + 2 + 3 + 4 + 5) = 3.22$

DELTAX = 9 - 1 + 1 = 9

DELTAY = 5 - 1 + 1 = 5

$$M_{a,b} = \frac{\sum_{perpixel} (x-\bar{x})^a (y-\bar{y})^b}{N \times deltax^a \times deltay^b},$$

where x = the horizontal position of a pixel, where y = the vertical position of the pixel, and where (a,b) = (1,1), (2,0), (0,2), (1,2), (2,1), (0,3), and (3,0).

FIG. 3

METHOD OF IDENTIFYING THE SCRIPT OF A DOCUMENT IRRESPECTIVE OF ORIENTATION

FIELD OF THE INVENTION

This invention relates to image analysis and, more particularly, to a method of identifying the script of a document irrespective of orientation.

BACKGROUND OF THE INVENTION

Analysis of a document image requires the identification of orientation, script, language, and characters. The identification of orientation is the task of determining which way is up. Assuming limited skew, there are four possible orientations (i.e., 0° or up, 180° or down, 90°, and 270°). Script identification is the task of determining the alphabet used in the document. Examples of common scripts include Arabic, Chinese, Cyrillic, Greek, Hebrew, Japanese, and Latin (or Roman). Language identification is the task of determining the language used in the document. Different languages may use the same script (e.g., English and French both use the Latin script). Character (or word) identification is the task of converting a character (or word) image to an encoding scheme such as ASCII or Unicode.

U.S. Pat. No. 5,664,027, entitled "METHOD AND APPARATUS FOR INFERRING ORIENTATION OF LINES OF TEXT," discloses a method of determining page orientation by determining the predominant orientation of lines connecting the centers of connected components to their nearest neighbors. It is stated in U.S. Pat. No. 5,664,027 that this method will not work with connected scripts which are used in Arabic. The method of U.S. Pat. No. 5,664,027 will also have difficulty with evenly spaced characters which are used in Chinese and Japanese. The method of U.S. Pat. No. 5,664,027 produces a horizontal versus vertical answer but cannot be used to produce a right-side-up versus upside-down answer or a top-to-the-left versus top-to-the-right answer. U.S. Pat. No. 5,664,027 is hereby incorporated by reference into the specification of the present invention.

U.S. Pat. No. 5,444,797, entitled "METHOD AND APPARATUS FOR AUTOMATIC CHARACTER SCRIPT DETERMINATION," discloses a method of determining the script from the connected components on a page image based upon features such as occurrences of upward facing concavities (e.g., the letters h, m, and n). Moment calculations are not specifically mentioned in U.S. Pat. No. 5,444,797. Upward concavities are relatively easy to detect if a two-dimensionally coded facsimile (fax) transmission is used and the scanned image quality is very good. The method of U.S. Pat. No. 5,444,797 would be much slower with a fax transmitted using one-dimensional coding. Much of the fax transmission today uses one-dimensional coding. Also, the latest fax compression scheme (i.e., JBIG or CCITT Standard T.82) is not readily compatible with the method of U.S. Pat. No. 5,444,797. Lastly, the method of U.S. Pat. No. 5,444,797 does not determine orientation. U.S. Pat. No. 5,444,797 is hereby incorporated by reference into the specification of the present invention.

U.S. Pat. No. 5,425,110, entitled "METHOD AND APPARATUS FOR AUTOMATIC LANGUAGE DETERMINATION OF ASIAN LANGUAGE DOCUMENTS," discloses a method of distinguishing between Chinese, Japanese, and Korean by examining the distribution of density (black pixels to total pixels) within the bounding boxes encompassing connected components. The method of U.S. Pat. No. 5,425,110 is very sensitive to the boldness of the font used in a document, whereas the present invention is not. Also, U.S. Pat No. 5,425,110 does not mention determining orientation or the use of a moment calculation as does the present invention. U.S. Pat. No. 5,425,110 is hereby incorporated by reference into the specification of the present invention.

U.S. Pat. No. 5,375,176, entitled "METHOD AND APPARATUS FOR AUTOMATIC CHARACTER TYPE CLASSIFICATION OF EUROPEAN SCRIPT DOCUMENTS," discloses a method of distinguishing between Latin scripts based on detecting ascenders, descenders, diacritics, and punctuation. These features are hard to distinguish accurately in a degraded document image, whereas the present invention discloses a method of distinguishing between any script contained in a document image that is, relatively, insensitive to image degradation. U.S. Pat. No. 5,375,176 is hereby incorporated by reference into the specification of the present invention.

An article by Cheng-Lin Liu et al, entitled "Extracting Individual Features from Moments for Chinese Writer Identification," published by the *IEEE* in 1995, discloses a particular moment calculation used on features extracted from a document image. The moment calculation is specifically tailored to the style the Chinese writing style (i.e., square characters are used and the resolution in the one direction is the same as in the other direction). The present invention is not constrained to accepting document images with only square characters. Lin et al. specifically say that "the normalization of moments [with] respect to rotation is unnecessary, and even detrimental." The present invention uses a different moment calculation that is normalized for different rotations of the document image with great effect. The present invention is also insensitive to differences in resolution between the different directions in the document image.

An article by H. Al-Yousefi et al., entitled "Recognition of Arabic Characters," published in the *IEEE Transactions On Pattern Analysis And Machine Intelligence*, Vol. 14, No. 8, August 1992, discloses a method of using a normalized moment calculation to identify Arabic characters that is different from the normalized moment calculation used in the present invention. Al-Yousefi et al. uses there normalized moments to obtain simple measures of shape, whereas the present invention uses a different normalized moment calculation to make a feature invariant to font thickness, horizontal size, and vertical size.

An article by Chong-Huah Lo et al., entitled "Pattern Recognition Using 3-D Moments," published by the *IEEE* in 1990, discloses a method of using a 3-D moment calculation normalized according to a constant, the area of a surface patch, and the total length of a curve in order to recognize a pattern. The moment calculation of Lo et al. differs from the two dimensional moment calculation of the present invention.

The document image processing methods of the prior art suffer from one or more of the following problems. First, the prior art methods may not determine both the orientation and the script of the image as does the present invention. Second, the prior art methods may be sensitive to the thickness of the font used in the document image, whereas the present invention is not. Third, the prior art method may not be able to process all scripts as can the present invention. Fourth, the prior art methods may be sensitive to the image compression scheme used to transmit the document image, whereas the present invention is not. Fifth, the calculations employed by the prior art methods may be computationally intensive, whereas the calculations of the present invention are highly efficient. Sixth, the prior art methods may perform poorly if the document image is degraded due to poor contrast, multiple generation reproduction, blurring, etc., whereas the performance of the present invention is not effected as much by such degradation. Also, a document image may be transmitted in any orientation. Prior art document image processing methods may not be able to process an image of unknown orientation, whereas the present invention can. The present invention is a method of processing a document image of any orientation and presenting the document in a user-defined orientation to a user if the document is of interest to the user. The user may specify which scripts the user is interested in.

SUMMARY OF THE INVENTION

It is an object of the present invention to identify the script of a document image in any orientation and present the document image to a user in a user-defined orientation if the script is of interest to the user.

It is another object of the present invention to identify the script of a document image in any orientation and present the document image to a user in a user-defined orientation if the script is of interest to the user using a unique normalized centered moment calculation that makes present invention invariant to the thickness and size of each set of connected pixels in the document image.

The objects of the present invention are realized by the following method.

First, receive a document image in any script and any orientation.

Second, identify each set of connected pixels in the document image.

Third, compute the total number of pixels (N) in each set of connected pixels in the document image.

Fourth, compute the horizontal mean (xmean) position of the pixels in each set of connected pixels in the document image.

Fifth, compute the vertical mean position (ymean) of the pixels in each set of connected pixels in the document image.

Sixth, compute the horizontal extent (deltax) of the pixels in each set of connected pixels in the document image.

Seventh, compute the vertical extent (deltay) of the pixels in set of connected pixels in the document image.

Eighth, compute a plurality of mathematical moments for each set of connected pixels in the document image using a unique normalized centered moment calculation as follows:

$$m_{a,b} = (E((x-\text{xmean})^a (y-\text{ymean})^b))/(((N)(\text{deltax}^a)(\text{deltay}^b))),$$

where the summation is performed for each pixel in the set of connected pixels being analyzed, where x is the horizontal position of a particular pixel, and where y is the vertical position of the particular pixel. In the preferred embodiment, the three second moments and the four third moments (i.e., (a,b)=(0,2), (1,1), (2,0), (0,3), (1,2), (2,1), and (3,0) are computed.

Ninth, group the results of step eight according to moment type.

Tenth, the moment calculations within each group are ordered according to moment value.

Eleventh, certain ranking positions are selected from each rank ordered moment group of the last step to represent the document image. In the preferred embodiment, the moment values at the following rank positions in each moment group are selected: 20th percentile, 40th percentile, 60th percentile, and 80th percentile.

Twelfth, compare the result of step eleven to a user-defined database containing representative document images in all desired scripts and orientations.

Thirteenth, the user selects one or more scripts that the user is interested in.

Fourteenth, the document image is rotated to a user-defined orientation, usually right-side-up so the user may easily read the document image, if the document image is of a script of interest to the user.

Fifteenth, the rotated document image is presented to the user if the document image is of a script of interest to the user.

BRIEF DESCRIPTION OF THE DRAWINGS

FIG. 1 is a list of the steps of the present invention;

FIG. 3 is an illustration of the moment calculation and the moments calculated in the present invention.

DETAILED DESCRIPTION

The present invention is a method of identifying the script and orientation of a document image so that it may be presented to a user who wishes to see documents of a certain script in an orientation that is easy to read. The steps of the preferred embodiment of the present invention are listed in FIG. 1. These steps are described below.

The first step of the present invention is to receive a document image. The document image may be in any script and in any orientation. A document image may be more efficiently, and more economically, transmitted in one orientation than another. An orientation that is efficient from a transmission standpoint may be inefficient from the point of view of a user who wishes to read the document image. A company may receive document images in many different scripts, or languages, but may have personnel that may only be able to read certain scripts. Therefore, document image processing may be made more efficient if there is a method of identifying the script of a document image, allowing the user to indicate which types of documents from a script standpoint the user is interested in, and present a document image to the user in a user-definable orientation that is only in the script that is of interest to the user. The present invention is such a method.

Figure 2:
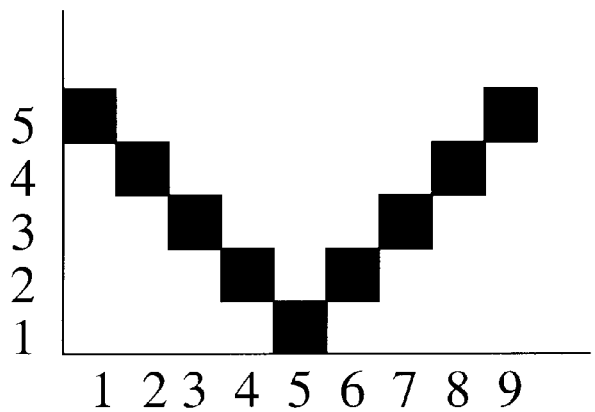
FIG. 2 is an illustration of a document image set of connected pixels and its associated numerical characteristics.

The second step of the method is to identify each set of connected pixels in the document image. A set of connected pixels may constitute a character, a number of characters, part of a single character, part of a number of characters. A set of connected pixels is commonly referred to as a connected component. For example, if a single letter (e.g., the letter "a") appears in the document image such that the pixels that make up that letter are connected then that single letter is identified as a single set of connected pixels. If the single letter is the letter "i," where the pixels that make up the dot are not connected to the body of the letter then this letter is identified as two sets of connected pixels (i.e., one set being the body of the letter and the other set being the dot). If a number of letters appear in a document such that a pixel of one letter contacts a pixel of another letter then the letters that are connected are identified as a single set of connected pixels. Each set of connected pixels that is not connected to another set of connected pixels (e.g., the dot in the letter "i") is identified as a separate set of connected pixels. FIG. 2 illustrates the letter "v" that may be included in a document image. Also included in FIG. 2 is a list of numerical values (i.e., N, xmean, ymean, deltax, and deltay) that may be used to characterize this letter in the document image. These numerical values are explained below. Each set of connected pixels in the document image will be characterized by the same type of numerical values. Each set of connected pixels is comprised of foreground colored pixels that contrast with the background of the document image. Typically, the foreground pixels are black, but the present invention will work for pixels of any color. Also, the background is, typically, white, but any color background may be used. The only requirement is that the color of each set of connected pixels contrasts with the color of the background.

The third step of the present invention is to compute the total number of pixels (N) in each set of connected pixels in the document image. The numerical value N is one of the numerical values listed in FIG. 2 that is used to characterize each set of connected pixels in the document image.

The fourth step in the present invention is to compute the horizontal mean (xmean) position of the pixels in each set of connected pixels in the document image. That is, the horizontal mean of a particular set of connected pixels equals the sum of all horizontal positions of the pixels in that particular set of connected pixels divided by the total number of pixels in the set of connected pixels. The horizontal mean represents the average horizontal position, or center of mass, or center of gravity, of the set of connected pixels. The numerical value xmean is one of the numerical values listed in FIG. 2 that is used to characterize each set of connected pixels in the document image.

The fifth step in the present invention is to compute the vertical mean position (ymean) of the pixels in each set of connected pixels in the document image. The vertical mean equals the sum of all vertical positions of the pixels in the particular set of connected pixels divided by the total number of pixels in the set of connected pixels. The vertical mean is the average vertical position, or center of mass, or center of gravity, of the set of connected pixels. The numerical value ymean is one of the numerical values listed in FIG. 2 that is used to characterize each set of connected pixels in the document image.

The sixth step in the present invention is to compute the horizontal extent (deltax) of the pixels in each set of connected pixels in the document image. The horizontal extent is the distance from the right-most pixel in a particular set of connect ed pixels to the left-most pixel in the set of connected pixels. That is, $$deltax=(xmax)-(xmin)+1,$$

where xmax is the horizontal position of the right-most pixel, and where xmin is the horizontal position of the left-most pixel. The numerical value deltax is one of the numerical values listed in FIG. 2 that is used to characterize each set of connected pixels in the document image.

The seventh step in the present invention is to compute the vertical extent (deltay) of the pixels in each set of connected pixels in the document image. The vertical extent is the distance from the top-most pixel in a particular set of connected pixels to the bottom-most pixel in the set of connected pixels. That is, $$deltay=(ymax)-(ymin)+1,$$

where ymax is the vertical position of the top-most pixel, and where ymin is the vertical position of the bottom-most pixel. The numerical value deltay is the last numerical value listed in FIG. 2 that is used to characterize each set of connected pixels in the document image.

The eighth step in the present invention is to compute a plurality of mathematical moments for each set of connected pixels in the document image using a unique normalized centered moment calculation as follows:

$$m_{a,b}=(E((x-xmean)^a(y-ymean)^b))/(((N)(deltax^a)(deltay^b))),$$

where the summation is performed for each pixel in a particular set of connected pixels, where x is the horizontal position of a particular pixel, and where y is the vertical position of the pixel. The unique normalized centered moment calculation and the preferred moments to be computed using this equation are illustrated in FIG. 3. The sum for the exponents "a" and "b" define the number of the moment being computed. For example, the two possible first moments are (a,b)=(0,1) and (1,0). The three possible second moments are (a,b)=(0,2), (1,1), and (2,0). The four possible third moments are (a,b)=(0,3), (1,2), (2,1), and (3,0). Other moments follow the same pattern. The unique normalized centered moment equation of the present invention may be used to compute the moment value of any moment number. However, in the preferred embodiment, the moment values of the three second moments and the four third moments (i.e., (a,b)=(0,2), (1,1), (2,0), (0,3), (1,2), (2,1), and (3,0)) are computed. For example, a document image containing a total of 100 sets of connected pixels would, preferably, have 700 moment values computed in step eight (i.e., seven moments for each of the 100 sets of connected pixels in the document image).

Using the number of pixels (N) as a divisor renders each moment computation independent of the thickness, or boldness, of the font used for the sets of connected pixels (i.e., characters). Using the horizontal extent (deltax) as a divisor renders each moment computation independent of the horizontal size of the particular set of connected pixels. Using the vertical extent (deltay) as a divisor renders each moment computation independent of the vertical size of the particular set of connected pixels. The seven moment values calculated in step eight for each set of connected pixels in the document image are used to describe each set of connected pixels, respectively.

The ninth step in the present invention is to group the results of step eight according to moment type. In the preferred embodiment, seven moments were calculated in step eight for each set of connected pixels in the document image. Each of the resulting moment calculations would then be grouped into one of seven moment categories (preferably moment type (0,2), (2,0), (1,1), (3,0), (0,3), (1,2), or (2,1)) according to its moment type. For example, if the total number of sets of connected pixels components in a document image is 100 and the total number of moment values calculated in step eight the sets of connected pixels is 700 then the result of step nine is seven categories, one for each moment type, where each category contains 100 items. That is, each group contains all of the moment values of a certain moment type for every set of connected pixels in the document image. Furthermore, moment group (1,1) contains all of the moment values of moment type (1,1) calculated for each set of connected pixels in the document image; moment group (2,0) contains all of the values of moment type (2,0) calculated for each set of connected pixels in the document image, and so on until each moment group is populated with every one of the moment values of the corresponding moment type.

The tenth step of the present invention is to rank order the moment values in each of the moment groups. For example, if each moment group contains 100 items then each group is ordered from 1 to 100 according to the moment values contained therein. If moment group (1,1) contains 100 items with moment values ranging from 101 to 200 then the moment value equal to 200 is ranked first, the moment value equal to 199 is ranked second, and so on until all of the moment values in the moment group are ranked in order of moment value. Here, the rank order was from largest value to smallest value. The rank order may also be from smallest value to largest value or any other suitable ranking. If moment group (0,2) contains 100 items with moment values ranging from 201 to 300 then the moment having the moment value of 300 is ranked first, the item having moment value 299 is ranked second, and so on until all of the items in this group are ranked in order of moment value. Each of the moment groups are ordered so.

Figure 4:
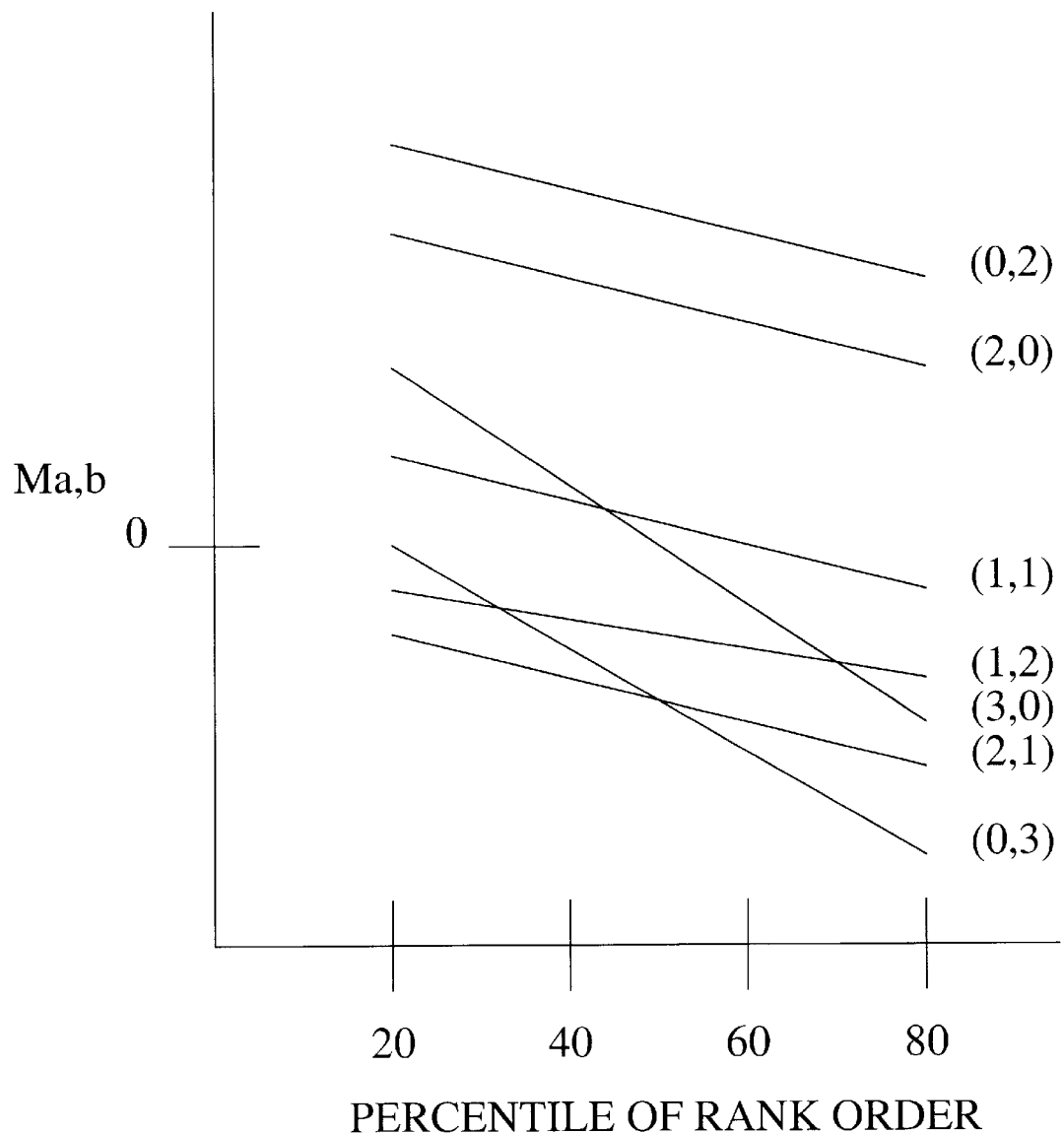
FIG. 4 is an illustration of the ranked ordered moment values of three moments.

The eleventh step of the present invention is to select the moment values from certain rank ordered positions of each moment group to characterize the document image. In the preferred embodiment, the following rank positions in each moment group are selected: 20th percentile, 40th percentile, 60th percentile, and 80th percentile. In the preferred embodiment, 28 moment values (i.e., four rank order moment values from each of the seven moment groups) represent, or characterize, the document image. All, or certain subsets, of the rank order positions may be selected, but computation efficiency is improved by selecting moment values at the four rank positions listed above. Also, the positions of the selected moment values do not have to be the same for each rank ordered moment group. Seven moment groups and the moment values selected therefrom are illustrated in FIG. 4.

The twelfth step in the present invention is to compare the result of step eleven to a user-defined database containing at least one representative document image in each of a user-definable number of scripts. Means and standard deviation values are generated from each of the representative document images, which are stored in the 0° orientation. Other orientations of the representative documents are simulated by changing signs and swapping values. Storing these virtual rotations is more efficient than storing all of the orientations of each representative document. Each representative document image and all of its virtual orientations are characterized using the procedures outlined in steps one through eleven listed above. A number of compare functions may be used, but a statistical compare method based on mean and standard deviation (in each of the 28 dimensions as defined by the 28 moment values selected) is preferred. If the document image to be identified is within a user-defined threshold, with respect to mean and standard deviation, of a database document of a particular script and orientation, then the document image is identified as being of the script type and orientation of the database document.

The thirteenth step in the present invention is for the user to select at least one script in which the user is interested in. Only documents written in the scripts selected by the user will be presented to the user while documents written in any other script will not be presented to the user.

The fourteenth step in the present invention is to rotate the document image to a user-defined orientation if the script of the document image is one of the scripts the user selected. In the preferred embodiment, the document image is rotated to the 0.orientation.

The fifteenth and last step of the present invention is to present the rotated document image to the user if the script of the document image is one of the scripts the user selected. The steps outlined above may be repeated for additional document images received.

What is claimed is:

1. A method of identifying the script and orientation of a document image, comprising the steps of:

a) receiving the document image in any script and in any orientation;

b) identifying each set of connected pixels in the document image;

c) computing the total number of pixels in each set of connected pixels in the document image;

d) computing the horizontal mean position of the pixels in each set of connected pixels in the document image;

e) computing the vertical mean position of the pixels in each set of connected pixels in the document image;

f) computing the horizontal extent of the pixels in each set of connected pixels in the document image;

g) computing the vertical extent of the pixels in each set of connected pixels in the document image;

h) computing a plurality of moment values for each set of connected pixels in the document image using a normalized centered moment calculation as follows:

$$m_{a,b} = (E((x - \text{xmean})^a (y - \text{ymean})^b)) / (((N) (\text{deltax}^a) (\text{deltay}^b))),$$

where the summation is performed for each pixel in each set of connected pixels, where x is the horizontal position of a particular pixel, where xmean is the horizontal mean position of the pixels in each set of connected pixels, where a is the x coordinate of the moment value being computed, where y is the vertical position of the particular pixel, where ymean is the vertical mean position of the pixels in each set of connected pixels, where b is the y coordinate of the moment value being computed, and where N is the total number of pixels in each set of connected pixels;

i) grouping the moment values of step (h) according to moment type, where moment type is defined by a coordinate consisting of (a,b);

j) sorting the moment values within each moment group resulting from step (i) according to moment value;

k) selecting moment values from each rank ordered moment group of step (j) for characterizing the document image;

l) comparing the selected moment values of step (k) to moment values for representative document images in a user-defined number of scripts and orientations;

m) defining the script and orientation of the document image as being the same as the representative document that it compares most favorably to within a user-definable threshold;

n) selecting at least one script of interest to the user;

o) rotating the document image to a user-defined orientation if the document image is of a script selected in step (n); and p) presenting the rotated document of step (o) to the user if the document image is of a script selected in step (n).

2. The method of claim 1, wherein said step of computing the total number of pixels comprises the step of computing the total number of black pixels.

3. The method of claim 1, wherein said step of computing the horizontal extent of the pixels comprises the step of computing $$deltax = xmax - xmin + 1,$$

where xmax is the horizontal position of the right-most pixel, and where xmin is the horizontal position of the left-most pixel.

4. The method of claim 1, wherein said step of computing the vertical extent of the pixels comprises the step of computing $$deltay = ymax - ymin + 1,$$

where ymax is the vertical position of the top-most pixel, and where ymin is the vertical position of the bottom-most pixel.

5. The method of claim 1, wherein said step of computing a plurality of moment values for each set of connected pixels comprises the step of computing seven moment values for each set of connected pixels, where the (a,b)=(1,1), (0,2), (2,0), (3,0), (0,3), (1,2), and (2,1).

6. The method of claim 1, wherein said step of comparing the results of step (k) comprises the step of comparing the results of step (k) using a Gaussian comparison technique that includes values for mean and standard deviation.

7. The method of claim 2, wherein said step of computing the horizontal extent of the pixels comprises the step of computing $$deltax = xmax - xmin + 1,$$

where xmax is the horizontal position of the right-most pixel, and where xmin is the horizontal position of the left-most pixel.

8. The method of claim 7, wherein said step of computing the vertical extent of the pixels comprises the step of computing $$deltay = ymax - ymin + 1,$$

where ymax is the vertical position of the top-most pixel, and where ymin is the vertical position of the bottom-most pixel.

9. The method of claim 8, wherein said step of computing a plurality of moment values for each set of connected pixels comprises the step of computing seven moment values for each set of connected pixels, where the (a,b)=(1,1), (0,2), (2,0), (3,0), (0,3), (1,2), and (2,1).

10. The method of claim 9, wherein said step of comparing the results of step (k) comprises the step of comparing the results of step (k) using a Gaussian comparison technique that includes values for mean and standard deviation.

* * * * *